US009426630B2

(12) United States Patent
Seok

(10) Patent No.: US 9,426,630 B2
(45) Date of Patent: Aug. 23, 2016

(54) METHOD FOR TRANSMITTING AND RECEIVING MULTICAST/BROADCAST FRAME IN WIRELESS LOCAL AREA NETWORK AND APPARATUS FOR THE SAME

(75) Inventor: Yong Ho Seok, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 423 days.

(21) Appl. No.: 13/535,238

(22) Filed: Jun. 27, 2012

(65) Prior Publication Data

US 2012/0327838 A1  Dec. 27, 2012

Related U.S. Application Data

(60) Provisional application No. 61/501,255, filed on Jun. 27, 2011.

(51) Int. Cl.
*H04W 4/06* (2009.01)
*H04W 72/00* (2009.01)

(52) U.S. Cl.
CPC .............. *H04W 4/06* (2013.01); *H04W 72/005* (2013.01)

(58) Field of Classification Search
None
See application file for complete search history.

(56) References Cited

U.S. PATENT DOCUMENTS

| | | | | |
|---|---|---|---|---|
| 7,496,061 | B2 * | 2/2009 | Oswal et al. | 370/312 |
| 8,392,593 | B1 * | 3/2013 | Wadhwa et al. | 709/231 |
| 8,526,351 | B2 * | 9/2013 | Fischer et al. | 370/312 |
| 8,879,455 | B1 * | 11/2014 | Stephenson et al. | 370/312 |
| 2005/0276237 | A1 * | 12/2005 | Segal et al. | 370/312 |
| 2007/0008967 | A1 * | 1/2007 | Bressler et al. | 370/390 |
| 2010/0260138 | A1 * | 10/2010 | Liu et al. | 370/330 |
| 2011/0110222 | A1 * | 5/2011 | Sood | 370/219 |
| 2011/0255458 | A1 * | 10/2011 | Chen et al. | 370/312 |
| 2012/0163292 | A1 * | 6/2012 | Kneckt et al. | 370/328 |
| 2012/0263089 | A1 * | 10/2012 | Gupta et al. | 370/312 |

* cited by examiner

*Primary Examiner* — Hassan Kizou
*Assistant Examiner* — Roberta A Shand
(74) *Attorney, Agent, or Firm* — Lee, Hong, Degerman, Kang & Waimey; Jonathan Kang; Harry Lee

(57) ABSTRACT

A method for transmitting multicast frames by a transmitter in a wireless local area network is provided. The method includes: receiving a first directed multicast service (DMS) request frame from a first receiver; receiving a second DMS frame from a second receiver; transmitting a DMS response frame to the first receiver and the second receiver; transmitting a VHT-SIG A field; and transmitting each data unit to the first receiver and the second receiver by a multi user-multiple input multiple output transmission. The first and second DMS request frames are transmitted for requesting DMS. The DMS response frame includes a response type indicating whether the requested DMS is accepted as the DMS for a multi user transmission.

8 Claims, 11 Drawing Sheets

METHOD FOR TRANSMITTING AND RECEIVING MULTICAST/BROADCAST FRAME IN WIRELESS LOCAL AREA NETWORK AND APPARATUS FOR THE SAME

CROSS-REFERENCE TO RELATED APPLICATIONS

Pursuant to 35 U.S.C. §119(e), this application claims the benefit of U.S. Provisional application No. 61/501,255 filed on Jun. 27, 2011, the contents of which are hereby incorporated by reference herein in their entirety.

BACKGROUND

1. Technical Field

The present invention relates to wireless communications, and more particularly, to a method of transmitting and receiving a frame to be multicast and/or broadcast in a wireless local area network (WLAN) system and an apparatus supporting the method.

2. Related Art

With the advancement of information communication technologies, various wireless communication technologies have recently been developed. Among the wireless communication technologies, a wireless local area network (WLAN) is a technology whereby Internet access is possible in a wireless fashion in homes or businesses or in a region providing a specific service by using a portable terminal such as a personal digital assistant (PDA), a laptop computer, a portable multimedia player (PMP), etc.

The IEEE 802.11n is a technical standard relatively recently introduced to overcome a limited data rate which has been considered as a drawback in the WLAN. The IEEE 802.11n is devised to increase network speed and reliability and to extend an operational distance of a wireless network. More specifically, the IEEE 802.11n supports a high throughput (HT), i.e., a data processing rate of up to above 540 Mbps, and is based on a multiple input and multiple output (MIMO) technique which uses multiple antennas in both a transmitter and a receiver to minimize a transmission error and to optimize a data rate.

With the widespread use of the WLAN and the diversification of applications using the WLAN, there is a recent demand for a new WLAN system to support a higher throughput than a data processing rate supported by the IEEE 802.11n. A next-generation WLAN system supporting a very high throughput (VHT) is a next version of the IEEE 802.11n WLAN system, and is one of IEEE 802.11 WLAN systems which have recently been proposed to support a data processing rate of above 1 Gbps in a MAC service access point (SAP).

To effectively utilize a radio channel, the next-generation WLAN system supports multi user-multiple input multiple output (MU-MIMO) transmission in which a plurality of non-access point (AP) stations (STAs) concurrently access to a channel. According to the MU-MIMO transmission, an AP can transmit a frame concurrently to one or more MIMO-paired STAs.

Meanwhile, in a WLAN system, a transmission AP and/or a transmission STA support transmission and/or reception of a multicast/broadcast frame in a unicast manner. This is called a directed multicast service (DMS). By using the DMS, the transmission AP and/or the transmission STA can transmit the multicast/broadcast frame to a specific reception STA.

The multicast/broadcast frame can be intended to be transmitted simultaneously to a plurality of reception STAs while transmitting the frame in the unicast manner. This is because in doing so, reliability and an overall throughput of the WLAN system can be improved. For this, there is an on-going attempt to transmit and receive the multicast/broadcast frame by using a MU-MIMO transmission scheme.

SUMMARY

The present invention provides a method of transmitting and receiving a multicast/broadcast frame in a wireless local area network (WLAN) system and an apparatus for supporting the method.

In an aspect, a method for transmitting multicast frames by a transmitter in a wireless local area network is provided. The method includes: receiving a first directed multicast service (DMS) request frame from a first receiver, the first DMS request frame including a request type field indicating the request of a DMS, the DMS is a service for transmitting a multicast frame by unicast; receiving a second directed multicast service (DMS) request from a second receiver, the second DMS request frame including the request type field indicating the request of the DMS; transmitting a DMS response frame to the first receiver and the second receiver, the DMS response frame including a response type field and a group identifier field, the response type indicating whether the requested DMS is accepted as the DMS for a multi user (MU) transmission, the group identifier field indicating a group identifier if the requested DMS is accepted as the DMS for the MU transmission; transmitting a VHT-SIG A field including the group identifier; and transmitting each data unit to the first receiver and the second receiver by a multi user-multiple input multiple output transmission, the each data unit including the multicast frame.

The first DMS request frame may further include a TCLAS element field and the TCLAS element field may include a multicast address for the multicast frame.

The second DMS request frame may further include the TCLAS element field.

The group identifier may be determined based on the multicast address.

The multicast frame may include a medium access control (MAC) header and the MAC header may include a transmitter address (TA) field and a receiver address (RA) field.

The RA field of the multicast frame transmitted to the first receiver may be set to a MAC address of the first receiver, and the RA field of the multicast frame transmitted to the second receiver may be set to a MAC address of the second receiver.

Each data unit may gave a format of an aggregate MAC protocol data unit (A-MPDU), the A-MPDU including at least one A-MPDU subframe regarding the multicast frame.

In another aspect, an apparatus for transmitting multicast frames is provided. The apparatus includes a transceiver transmitting and receiving radio signals and a processor operatively coupled to the transceiver. The processor is configured for: receiving a first directed multicast service (DMS) request frame from a first receiver, the first DMS request frame including a request type field indicating the request of a DMS, the DMS is a service for transmitting a multicast frame by unicast; receiving a second directed multicast service (DMS) request from a second receiver, the second DMS request frame including the request type field indicating the request of the DMS; transmitting a DMS response frame to the first receiver and the second receiver, the DMS response frame including a response type field and a group identifier field, the response type indicating whether the requested DMS is accepted as the DMS for a multi user (MU) transmission, the group identifier field indicating a group identifier if the requested DMS is accepted as the DMS for the MU transmission; transmitting a VHT-SIG A field including the group identifier; and transmitting each data unit to the first receiver and the second receiver by a multi user-multiple input multiple output transmission, the each data unit including the multicast frame.

The first DMS request frame may further include a TCLAS element field and the TCLAS element field may include a multicast address for the multicast frame.

The second DMS request frame may further include the TCLAS element field.

The group identifier may be determined based on the multicast address.

The multicast frame may include a medium access control (MAC) header and the MAC header may include a transmitter address (TA) field and a receiver address (RA) field.

The RA field of the multicast frame transmitted to the first receiver may be set to a MAC address of the first receiver and the RA field of the multicast frame transmitted to the second receiver may be set to a MAC address of the second receiver.

Each data unit may have a format of an aggregate MAC protocol data unit (A-MPDU), the A-MPDU including at least one A-MPDU subframe regarding the multicast frame.

DESCRIPTION OF EXEMPLARY EMBODIMENTS

Figure 1:
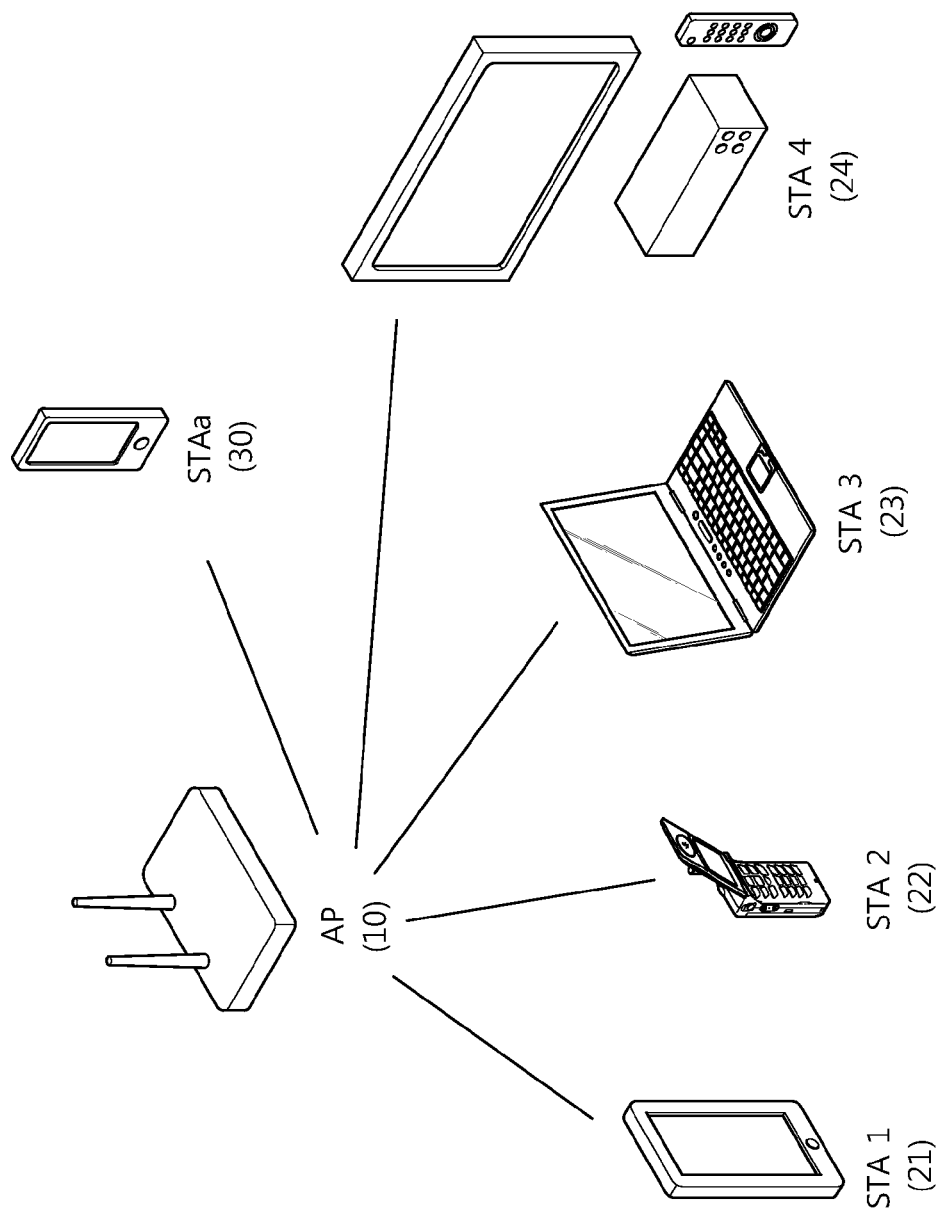
FIG. 1 is a diagram showing the configuration of a WLAN system to which embodiments of the present invention may be applied.

FIG. 1 is a diagram showing the configuration of a WLAN system to which embodiments of the present invention may be applied.

Referring to FIG. 1, A WLAN system includes one or more Basic Service Set (BSSs). The BSS is a set of stations (STAs) which can communicate with each other through successful synchronization. The BSS is not a concept indicating a specific area An infrastructure BSS includes one or more non-AP STAs STA1, STA2, STA3, STA4, and STA5, an AP (Access Point) providing distribution service, and a Distribution System (DS) connecting a plurality of APs. In the infrastructure BSS, an AP manages the non-AP STAs of the BSS.

On the other hand, an Independent BSS (IBSS) is operated in an Ad-Hoc mode. The IBSS does not have a centralized management entity for performing a management function because it does not include an AP. That is, in the IBSS, non-AP STAs are managed in a distributed manner. In the IBSS, all STAs may be composed of mobile STAs. All the STAs form a self-contained network because they are not allowed to access the DS.

An STA is a certain functional medium, including Medium Access Control (MAC) and wireless-medium physical layer interface satisfying the Institute of Electrical and Electronics Engineers (IEEE) 802.11 standard. Hereinafter, the STA refers to both an AP and a non-AP STA.

A non-AP STA is an STA which is not an AP. The non-AP STA may also be referred to as a mobile terminal, a wireless device, a wireless transmit/receive unit (WTRU), a user equipment (UE), a mobile station (MS), a mobile subscriber unit, or simply a user. For convenience of explanation, the non-AP STA will be hereinafter referred to the STA.

The AP is a functional entity for providing connection to the DS through a wireless medium for an STA associated with the AP. Although communication between STAs in an infrastructure BSS including the AP is performed via the AP in principle, the STAs can perform direct communication when a direct link is set up. The AP may also be referred to as a central controller, a base station (BS), a node-B, a base transceiver system (BTS), a site controller, etc.

A plurality of infrastructure BSSs including the BSS shown in FIG. 1 can be interconnected by the use of the DS. An extended service set (ESS) is a plurality of BSSs connected by the use of the DS. APs and/or STAs included in the ESS can communicate with each another. In the same ESS, an STA can move from one BSS to another BSS while performing seamless communication.

In a WLAN system based on IEEE 802.11, a basic access mechanism of a medium access control (MAC) is a carrier sense multiple access with collision avoidance (CSMA/CA) mechanism. The CSMA/CA mechanism is also referred to as a distributed coordinate function (DCF) of the IEEE 802.11 MAC, and basically employs a "listen before talk" access mechanism. In this type of access mechanism, an AP and/or an STA senses a wireless channel or medium before starting transmission. As a result of sensing, if it is determined that the medium is in an idle status, frame transmission starts by using the medium. Otherwise, if it is sensed that the medium is in an occupied status, the AP and/or the STA does not start its transmission but sets and waits for a delay duration for medium access.

The CSMA/CA mechanism also includes virtual carrier sensing in addition to physical carrier sensing in which the AP and/or the STA directly senses the medium. The virtual carrier sensing is designed to compensate for a problem that can occur in medium access such as a hidden node problem. For the virtual carrier sending, the MAC of the WLAN system uses a network allocation vector (NAV). The NAV is a value transmitted by an AP and/or an STA, currently using the medium or having a right to use the medium, to anther AP or another STA to indicate a remaining time before the medium returns to an available state. Therefore, a value set to the NAV corresponds to a period reserved for the use of the medium by an AP and/or an STA transmitting a corresponding frame.

An IEEE 802.11 MAC protocol, together with a DCF, provides a Hybrid Coordination Function (HCF) based on a Point Coordination Function (PCF) in which a reception AP or a reception STA or both periodically poll a data frame using the DCF and a polling-based synchronous access scheme. The HCF includes Enhanced Distributed Channel Access (EDCA) in which a provider uses an access scheme for providing a data frame to a number of users as a contention-based scheme and HCF Controlled Channel Access (HCCA) employing a non-contention-based channel access scheme employing a polling mechanism. The HCF includes a medium access mechanism for improving the Quality of Service (QoS) of a WLAN and can transmit QoS data both in a Contention Period (CP) and a Contention-Free Period (CFP).

Figure 2:
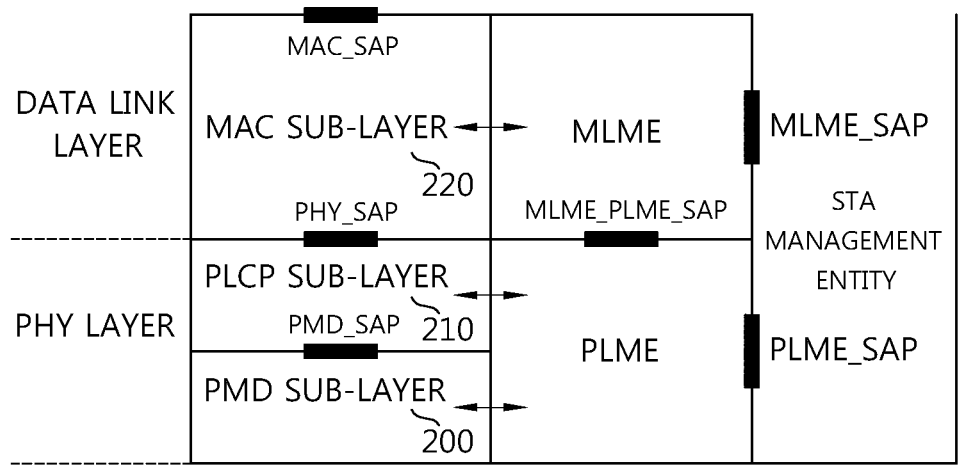
FIG. 2 shows a physical layer architecture of a WLAN system supported by IEEE 802.11.

FIG. 2 shows a physical layer architecture of a WLAN system supported by IEEE 802.11.

The IEEE 802.11 PHY architecture includes a PHY layer management entity (PLME), a physical layer convergence procedure (PLCP) sub-layer 210, and a physical medium dependent (PMD) sub-layer 200. The PLME provides a PHY management function in cooperation with a MAC layer management entity (MLME). The PLCP sub-layer 210 located between a MAC sub-layer 220 and the PMD sub-layer 200 delivers to the PMD sub-layer 200 a MAC protocol data unit (MPDU) received from the MAC sub-layer 220 under the instruction of the MAC layer, or delivers to the MAC sub-layer 220 a frame received from the PMD sub-layer 200. The PMD sub-layer 200 is a lower layer of the PDCP sub-layer and serves to enable transmission and reception of a PHY entity between two STAs through a radio medium. The MPDU delivered by the MAC sub-layer 220 is referred to as a physical service data unit (PSDU) in the PLCP sub-layer 210. Although the MPDU is similar to the PSDU, when an aggregated MPDU (A-MPDU) in which a plurality of MPDUs are aggregated is delivered, individual MPDUs and PSDUs may be different from each other.

The PLCP sub-layer 210 attaches an additional field including information required by a PHY transceiver in a process of receiving the PSDU from the MAC sub-layer 220 and delivering the PSDU to the PMD sub-layer 200. The additional field attached to the PSDU in this case may be a PLCP preamble, a PLCP header, tail bits required to reset an convolution encoder to a zero state, etc. The PLCP sublayer 210 receives a TXVECTOR parameter, including control information necessary to generate and transmit a Physical Layer Convergence Procedure (PLCP) Protocol Data Unit (PPDU) and control information necessary for a receiving STA to receive and interpret the PPDU, from the MAC sub-layer 220. The PLCP sublayer 210 uses the information included in the TXVECTOR parameter in order to generate the PPDU including the PSDU.

The PLCP preamble serves to allow a receiver to prepare a synchronization function and antenna diversity before the PSDU is transmitted. In the PSDU, the data field may include padding bits, a service field including a bit sequence for initializing a scrambler, and a coded sequence obtained by encoding a bit sequence to which tail bits are attached. In this case, either binary convolutional coding (BCC) encoding or low density parity check (LDPC) encoding can be selected as an encoding scheme according to an encoding scheme supported in an STA that receives a PLCP protocol data unit (PPDU). The PLCP header includes a field that contains information on a PPDU to be transmitted, which will be described below in greater detail with reference to FIG. 3.

The PLCP sub-layer 210 generates a PPDU by attaching the aforementioned field to the PSDU and transmits the generated PPDU to a reception STA via the PMD sub-layer. The reception STA receives the PPDU, acquires information required for data recovery from the PLCP preamble and the PLCP header, and recovers the data. The PLCP sublayer of the receiving STA transfers an RXVECTOR parameter, including control information included in a PLCP preamble and a PLCP header, to an MAC sublayer so that the MAC sublayer can interpret the PPDU and obtain data in a reception state.

Unlike the existing WLAN system, the next-generation WLAN system requires a higher throughput which is called a Very High Throughput (VHT). To this end, the next-generation WLAN system tries to support 80 MHz bandwidth transmission, contiguous 160 MHz bandwidth transmission, non-contiguous 160 MHz bandwidth transmission or higher. Furthermore, an MU-MIMO transmission method is provided for a higher throughput. The AP of the next-generation WLAN system can transmit a data frame to one or more MIMO-paired STAs at the same time.

In a WLAN system, such as that shown in FIG. 1, an AP 10 can transmit data to an STA group, including at least one of a plurality of STAs 21, 22, 23, 24, and 30 associated therewith, at the same time. In a WLAN system, such as that shown in FIG. 1, the AP 10 may transmit data to an STA group including at least one STA, from among the plurality of STAs 21, 22, 23, 24, and 30 associated therewith, at the same time. An example where the AP performs MU-MIMO transmission to the STAs is shown in FIG. 1. In a WLAN system supporting Tunneled Direct Link Setup (TDLS), Direct Link Setup (DLS), or a mesh network, however, an STA trying to send data may send a PPDU to a plurality of STAs by using the MU-MIMO transmission scheme. An example where an AP sends a PPDU to a plurality of STAs according to the MU-MIMO transmission scheme is described below.

The data respectively transmitted to each of the STAs may be transmitted through different spatial streams. The data packet transmitted by the AP 10 may be a PPDU, generated and transmitted by the physical layer of a WLAN system, or a data field included in the PPDU, and the data packet may be referred to as a frame. That is, a PPDU or a data field for SU-MIMO and/or MU-MIMO, which is included in the PPDU, may be referred as a MIMO packet. In an example of the present invention, it is assumed that a target transmission STA group MU-MIMO-paired with the AP 10 includes the STA 1 21, the STA 2 22, the STA 3 23, and the STA 4 24. Here, data may not be transmitted to a specific STA of the target transmission STA group because spatial streams are not allocated to the specific STA. Meanwhile, it is assumed that the STAa 30 is associated with the AP 10, but not included in the target transmission STA group.

When the AP transmits a PPDU to a plurality of STAs by using a MU-MIMO transmission scheme, the AP transmits the PPDU by inserting information indicating a group ID into the PPDU as control information. When the STA receives the PPDU, the STA confirms the group ID field and thus confirms whether the STA is a member STA of a transmission target STA group. If it is confirmed that the STA is the member of the transmission target STA group, the STA can determine at which position a spatial stream set to be transmitted to the STA is located among all spatial streams. Since the PPDU includes information indicating the number of spatial streams allocated to a reception STA, the STA can receive data by searching for spatial streams allocated to the STA.

Figure 3:
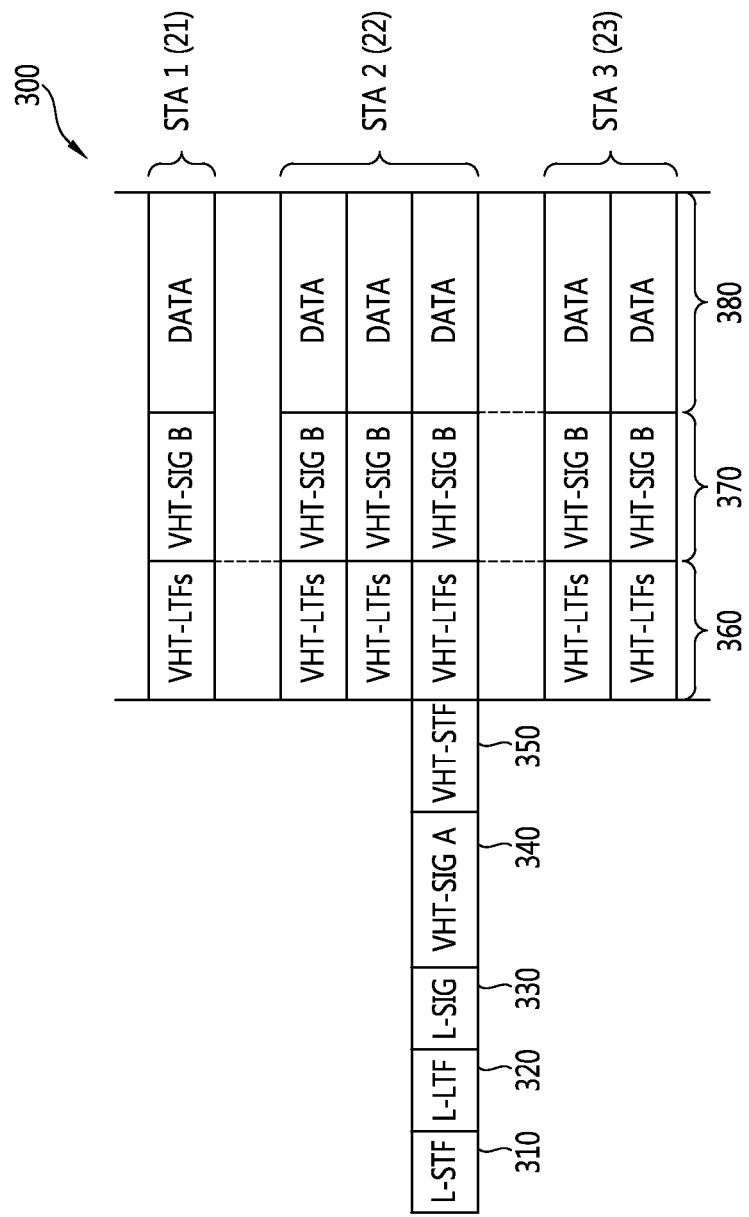
FIG. 3 shows an example of a PPDU format used in a WLAN system.

FIG. 3 shows an example of a PPDU format used in a WLAN system.

Referring to FIG. 3, a PPDU 300 includes an L-STF field 310, an L-LTF field 320, an L-SIG field 330, a VHT-SIGA field 340, a VHT-STF field 350, a VHT-LTF field 360, a VHT-SIGB field 370, and a data field 380.

A PLCP sub-layer constituting a PHY converts a PSDU delivered from a MAC layer into the data field 380 by appending necessary information to the PSDU, generates the PPDU 300 by appending several fields such as the L-STF field 310, the L-LTF field 320, the L-SIG field 330, the VHT-SIGA field 340, the VHT-STF field 350, the VHT-LTF field 360, the VHT-SIGB field 370, or the like, to the data field and delivers the PPDU 300 to one or more STAs through a physical medium dependent (PMD) sub-layer constituting the PHY. Control information required by the PLCP sub-layer to generate the PPDU and control information used by a reception STA to interpret the PPDU and transmitted by being included in the PPDU are provided from a TXVECTOR parameter delivered from the MAC layer.

The L-SFT 310 is used for frame timing acquisition, automatic gain control (AGC) convergence, coarse frequency acquisition, etc.

The L-LTF field 320 is used for channel estimation for demodulation of the L-SIG field 330 and the VHT-SIGA field 340.

The L-SIG field 330 is used when the L-STA receives the PPDU 300 and interprets it to acquire data. The L-SIG field 330 includes a rate sub-field, a length sub-field, a parity bit and tail field. The rate sub-field is set to a value indicating a bit state for data to be currently transmitted.

The length sub-field is set to a value indicating an octet length of a PSDU to be transmitted by the PHY layer at the request of the MAC layer. In this case, an L_LENGTH parameter which is a parameter related to information indicating the octet length of the PSDU is determined based on a TXTIME parameter which is a parameter related to a transmission time. TXTIME indicates a transmission time determined for PPDU transmission including the PSDU by the PHY layer in association with a transmission time requested for transmission of the PSDU. Therefore, since the L_LENGTH parameter is a time-related parameter, the length sub-field included in the L-SIG field 330 includes information related to the transmission time.

The VHT-SIGA field 340 includes control information (or signal information) required by STAs for receiving the PPDU to interpret the PPDU 300. The VHT-SIGA 340 is transmitted on two OFDM symbols. Accordingly, the VHT-SIGA field 340 can be divided into a VHT-SIGA1 field and a VHT-SIGA2 field. The VHT-SIGA1 field includes channel bandwidth information used for PPDU transmission, identifier information related to whether space time block coding (STBC) is used, information indicating either SU or MU-MIMO as a PPDU transmission scheme, and, if the transmission scheme is MU-MIMO, information indicating a transmission target STA group of a plurality of STAs which are MU-MIMO paired with the AP, and information regarding a spatial stream allocated to each STA included in the transmission target STA group. The VHT-SIGA2 field includes information related to a short guard interval (GI).

The information indicating the MIMO transmission scheme and the information indicating the transmission target STA group can be implemented as one piece of MIMO indication information, and for example, can be implemented as a group ID. The group ID can be set to a value having a specific range. A specific value in the range indicates an SU-MIMO transmission scheme, and other values can be used as an identifier for a corresponding transmission target STA group when the MU-MIMO transmission scheme is used to transmit the PPDU 300.

When the group ID indicates that the PPDU 300 is transmitted using the SU-MIMO transmission scheme, the VHT-SIGA2 field includes coding indication information indicating whether a coding scheme applied to the data field is binary convolution coding (BCC) or low density parity check (LDPC) coding and modulation coding scheme (MCS) information regarding a channel between a transmitter and a receiver. In addition, the VHT-SIGA2 field can include an AID of a transmission target STA of the PPDU and/or a partial AID including a part of bit-sequence of the AID.

When the group ID indicates that the PPDU 300 is transmitted using the MU-MIMO transmission scheme, the VHT-SIGA field 300 includes coding indication information indicating whether a coding scheme applied to the data field which is intended to be transmitted to MU-MIMO paired reception STAs is BCC or LDPC coding. In this case, MCS information for each reception STA can be included in the VHT-SIGB field 370.

The VHT-STF 350 is used to improve performance of AGC estimation in MIMO transmission.

The VHT-LTF 360 is used when the STA estimates a MIMO channel. Since the next generation WLAN system supports MU-MIMO, the VHT-LTF field 360 can be configured by the number of spatial streams in which the PPDU 300 is transmitted. In addition, when full channel sounding is supported and is performed, the number of VHT-LTFs may increase.

The VHT-SIGB field 370 includes dedicated control information required when the plurality of MIMO-paired STAs receive the PPDU 300 to acquire data. Therefore, the STA may be designed such that the VHT-SIGB field 370 is decoded only when the control information included in the VHT-SIGA field 340 indicates that the currently received PPDU 300 is transmitted using MU-MIMO transmission. On the contrary, the STA may be designed such that the VHT-SIGB field 370 is not decoded when the control information in the VHT-SIGA field 340 indicates that the currently received PPDU 300 is for a single STA (including SU-MIMO).

The VHT-SIGB field 370 may include MCS information and rate-matching information for each STA. Further, the VHT-SIGB field 370 may include information indicating a PSDU length included in the data field for each STA. The information indicating the PSDU length is information indicating a length of a bit-sequence of the PSDU and can be indicated in the unit of octet. Meanwhile, when the PPDU is transmitted based on single user transmission, the information about the MCS may not be included in the VHT-SIGB field 370, because that is included in the VHT-SIGA field 340. A size of the VHT-SIGB field 370 may differ according to the MIMO transmission method (MU-MIMO or SU-MIMO) and a channel bandwidth used for PPDU transmission.

The data field 380 includes data intended to be transmitted to the STA. The data field 380 includes a service field for initializing a scrambler and a PLCP service data unit (PSDU) to which a MAC protocol data unit (MPDU) of a MAC layer is delivered, a tail field including a bit sequence required to reset a convolution encoder to a zero state, and padding bits for normalizing a length of the data field. In case of MU transmission, each data unit intended to be respectively transmitted to each STA may be included in the data field 380. The data unit may be aggregate MPDU (A-MPDU).

In the WLAN system of FIG. 1, if the AP 10 intends to transmit data to the STA1 21, the STA2 22, and the STA3 23, then a PPDU may be transmitted to an STA group including the STA1 21, the STA2 22, the STA3 23, and the STA4 24. In this case, as shown in FIG. 2, no spatial stream may be allocated to the STA4 24, and a specific number of spatial streams may be allocated to each of the STA1 21, the STA2 22, and the STA3 23 and thus data can be transmitted. In the example of FIG. 2, one spatial stream is allocated to the STA1 21, three spatial streams are allocated to the STA2 22, and two spatial streams are allocated to the STA3 23.

For a MU-MIMO transmission scheme, a group ID may be allocated to a transmission target STA group. AP transmits a group ID management frame including a group ID management element for allocating a group ID to STAs supporting the MU-MIMO transmission, so that the group ID can be allocated to the STAs before a transmission of a PPDU. A plurality of group IDs may be allocated to one STA.

Figure 4:
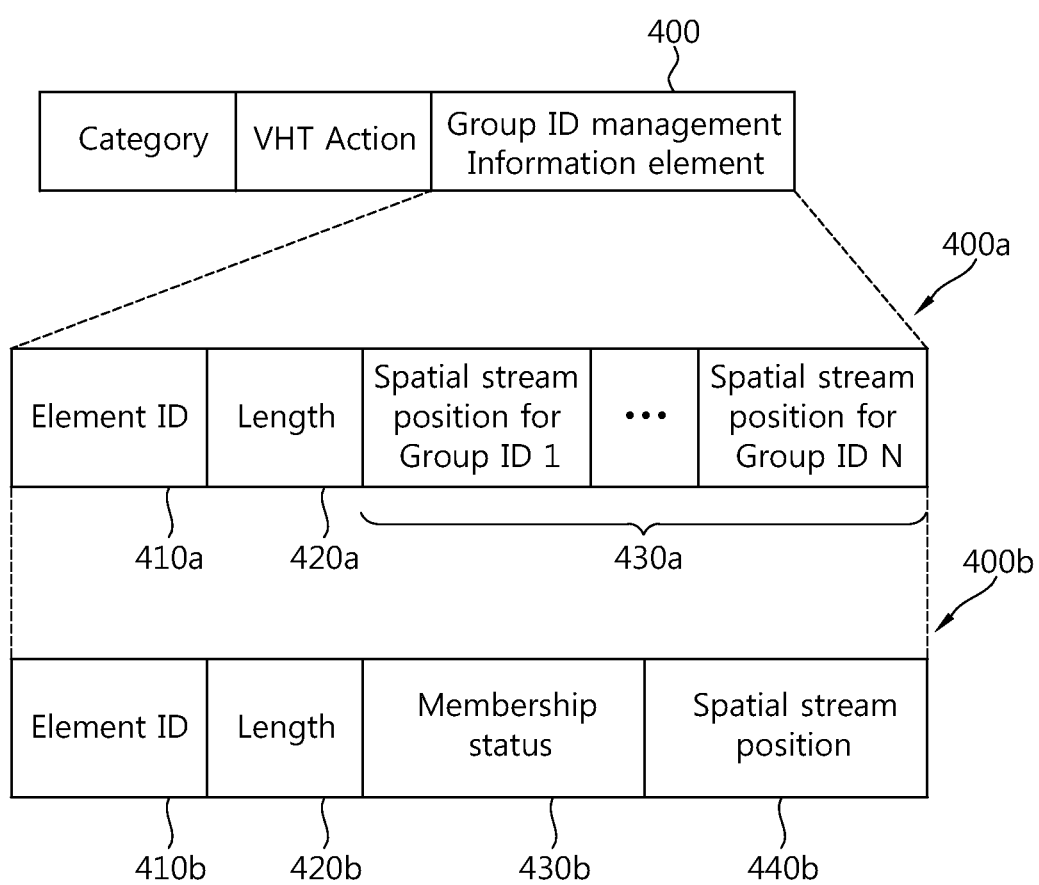
FIG. 4 is a diagram showing a group ID management frame format and a group ID management information element format.

FIG. 4 is a diagram showing a group ID management frame format and a group ID management information element format.

Referring to FIG. 4, a group ID management frame indicates that a corresponding frame is a management frame, and may include a VHT action field and a category field configured to indicate the group ID management frame used in a next generation WLAN system supporting MU-MIMO.

The group ID management frame includes a group ID management information element 400 including management information for a group ID. The group ID management information element 400 can implement the group ID management information in various types.

For example, a group ID management information element 400a can include an element ID field 410a, a length field 420a, and a spatial stream position field 430a for at least one specific group ID. The number of spatial stream position fields 430a may correspond to the number of group IDs supported in the WLAN system. For example, if 64 group IDs are supported, the number of spatial stream position fields 430a may be 64.

The spatial stream position field 430a can indicate, for each group ID, whether an STA for receiving the group ID management frame is included in a transmission target STA group indicated by the group ID and if the STA is included therein, can indicate at which position a spatial stream set allocated to the STA is located.

For example, if values of at least one spatial stream position field are 0, 1, 2, 4, 0, 0, 0, . . . , 0, 0, 0 in the group ID management information element received by the STA, it indicates that the STA is included in a transmission target STA group indicated by a group ID 2, a group ID 3, and a group ID 4. Further, it indicates that a $1^{st}$ spatial stream set is allocated to the STA for the group ID 2, a $2^{nd}$ spatial stream set is allocated to the STA for the group ID 3, and a $4^{th}$ spatial stream set is allocated to the STA for the group ID 4. Accordingly, the STA can receive data by using at least one spatial stream corresponding to a position of a pre-allocated spatial stream set when receiving a PPDU transmitted using a group ID indicating an STA group to which the STA is included.

As a second example, a spatial stream position field having a length of 3 bits can be configured such that a first bit is used as a bit indicating whether a group ID corresponding to the spatial stream position field is assigned to the STA and, if it is assigned, the remaining two bits are used to indicate at which position a specific spatial stream set is assigned. If a specific one bit indicates that the group ID is not assigned, the remaining two bits can be regarded as reserved bits. The aforementioned bit assignment is for exemplary purposes only. Thus, information configured such that one bit indicates whether the group ID is assigned and the remaining bits indicate positions of spatial stream sets is also included in the scope of the present invention.

For another example, a group ID management information element 400b can include an element ID field 410b, a length field 420b, a membership status field 430b, and a spatial stream position field 440b.

The membership status field 430b indicates whether the STA is included in a transmission target STA group indicated by a specific group ID. The spatial stream position field 440b indicates at which position a spatial stream set for the STA is located.

Since one AP manages a plurality of group IDs, membership status information provided to one STA needs to indicate whether the STA is included in a transmission target STA group indicated by each group ID managed by the AP. Therefore, the membership status information can be implemented in an array format of sub-fields indicating whether the STA is included in the transmission target STA group indicated by each group ID. Since spatial stream position information indicates a position of a spatial stream set for each group ID, it can be implemented in an array format of sub-fields indicating a position of a spatial stream set allocated to the STA for each group ID. In addition, the group ID management information element 400a can be interpreted as an example in which membership status information and spatial stream position information are implemented in one sub-field.

As an example of implementations, if a specific bit of the membership status field 430b indicates that the group ID is assigned to the STA, a bit sequence corresponding to the group ID of the spatial stream position field 440b can be configured to indicate a position of a spatial stream set for the group ID. On the other hand, if it is indicated that a specific group ID is not assigned, the bit sequence corresponding to the group ID of the spatial stream position field 440b can be reserved when implemented.

In the aforementioned two examples of implementing the group ID management information element, specific bits of the membership status field 430b and the spatial stream position field 430a corresponding to a specific group ID indicating single user (SU) transmission and a specific bit sequence of the spatial stream position field 440b can be reserved when implemented. For example, in a WLAN system in which 64 group IDs are supported and group IDs 0 and 63 are used to indicate SU transmission, specific bits of the membership status field 430b and the spatial stream position field 430a corresponding to the group IDs 0 and 63 and a specific bit sequence of the spatial stream position field 440b can be reserved when implemented.

Meanwhile, if a PPDU is transmitted through MU-MIMO transmission, a transmission time of the PPDU transmitted to each STA must be synchronized. For this, a null padding scheme can be used, and an A-MPDU can be utilized for the null padding.

Figure 5:
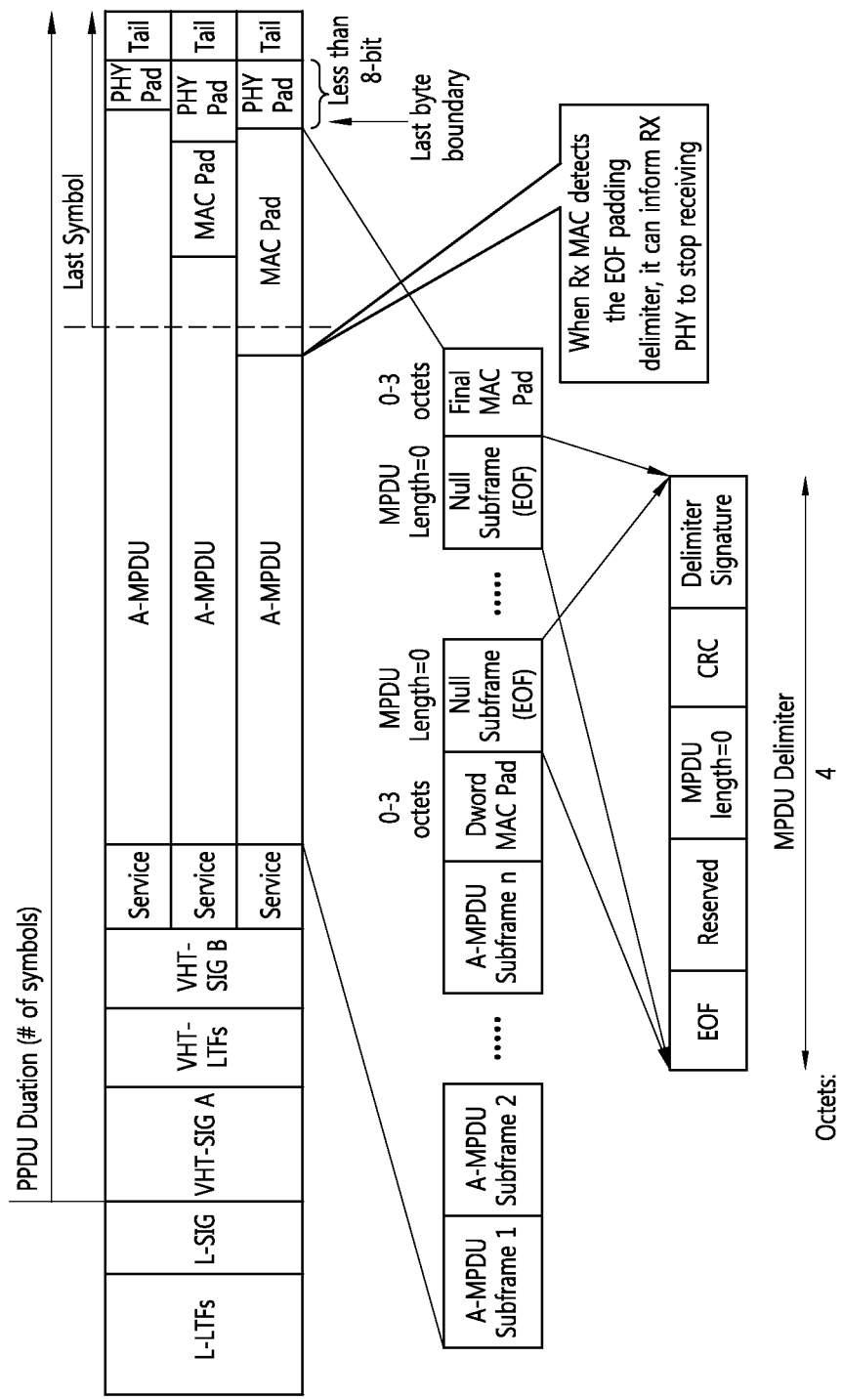
FIG. 5 shows an exemplary structure of a PPDU transmitted by using an MU-MIMO transmission scheme according to an embodiment of the present invention.

FIG. 5 shows an exemplary structure of a PPDU transmitted by using an MU-MIMO transmission scheme according to an embodiment of the present invention. An A-MPDU related to data transmitted to each STA may include at least one A-MPDU subframe. In this case, a specific A-MPDU subframe may include an MPDU including actual data, or may not include an MPDU related to data. In the A-MPDU of FIG. 5, an A-MPDU subframe including the MPDU can be denoted by an A-MPDU subframe, and an A-MPDU subframe not including the MPDU can be denoted by a null subframe end of frame (EOF).

Figure 6:
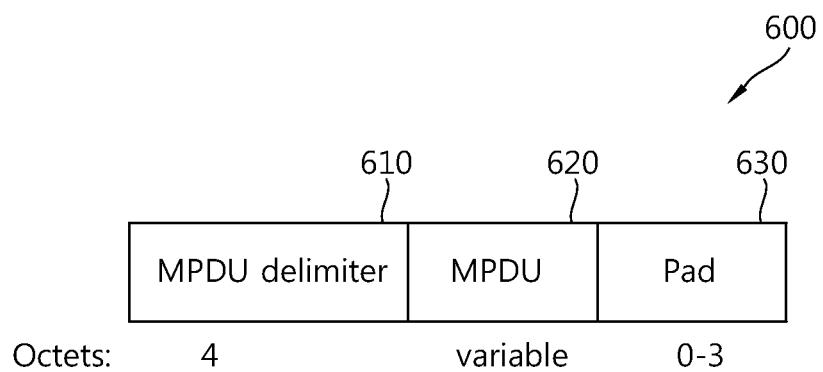
FIG. 6 shows a format of an A-MPDU subframe according to an embodiment of the present invention.

FIG. 6 shows a format of an A-MPDU subframe according to an embodiment of the present invention. Referring to FIG. 6, an A-MPDU subframe 600 may include an MPDU delimiter 610, an MPDU 620, and padding bits 630. The MPDU delimiter 610 includes information regarding a corresponding A-MPDU subframe 610. The MPDU 620 includes data to be transmitted by an AP and/or an STA. The padding bits 630 can be attached to standardize a length of the A-MPDU subframe to a multiple of 4 octets. However, if the A-MPDU subframe is a last subframe of the A-MPDU, the padding bits may not be attached.

Referring to FIG. 5 and FIG. 6, null padding can be implemented by attaching at least one null subframe not including an MPDU. The null subframe is an A-MPDU subframe including only an MPDU delimiter. The null subframe may be an A-MPDU subframe in which an EOF of the MPDU delimiter is set to '1', and an MPDU length field is set to '0'. That is, the null padding can be implemented such that at least one MPDU delimiter having a length of 4 octets is attached.

If it is intended to transmit a data bit sequence having a different length to each STA as shown in FIG. 5 and FIG. 6, null padding can be performed to synchronize a transmission time for MU-MIMO transmission, and the aforementioned data field of FIG. 2 can be generated by attaching a service field, PHY padding bits, and a tail field to the A-MPDU generated through the null padding and transmitted to each STA. Therefore, the PPDU transmitted to each STA through MU-MIMO transmission can be time-synchronized.

In a WLAN system, an AP can transmit a multicast/broadcast frame in a unicast manner. Transmitting of the multicast/broadcast frame to the STA in the unicast manner is called a directed multicast service (DMS). Hereinafter, the multicast/broadcast frame is simply referred to as a multicast frame. However, it can be understood such that the multicast frame indicates the multicast frame and/or the broadcast frame.

A DMS provided by an AP can be initiated by a DMS request of an STA or a DMS response of the AP. The DMS request may be transmitting of a DMS request frame to request the AP to transmit the multicast frame in a unicast manner. The DMS response may be transmitting of a DMS response frame by the AP to the STA as a response of the request of the STA in response to the DMS request frame.

When the multicast frame is transmitted in the unicast manner, a transmitter address (TA) of a MAC header of the frame may be set to a MAC address of an AP which is a transmitter. In addition, a receiver address (RA) of the MAC header of the frame may be set to a MAC address of an STA which is a requester of the DMS and which is a receiver of the frame. Since the frame is actually the multicast frame, a multicast address (in case of the broadcast frame, a broadcast address is included) for the multicast needs to be transmitted together when transmitting the frame. However, an additional field for including the multicast address is not defined in the MAC header of the typical frame. In order to solve this problem, the present invention may propose a method of converting a multicast frame into a unicast frame such that the frame is converted into a frame of an aggregated MSDU (A-MSDU) format and is then transmitted. This is called converting of the multicast frame into the unicast frame.

Figure 7:
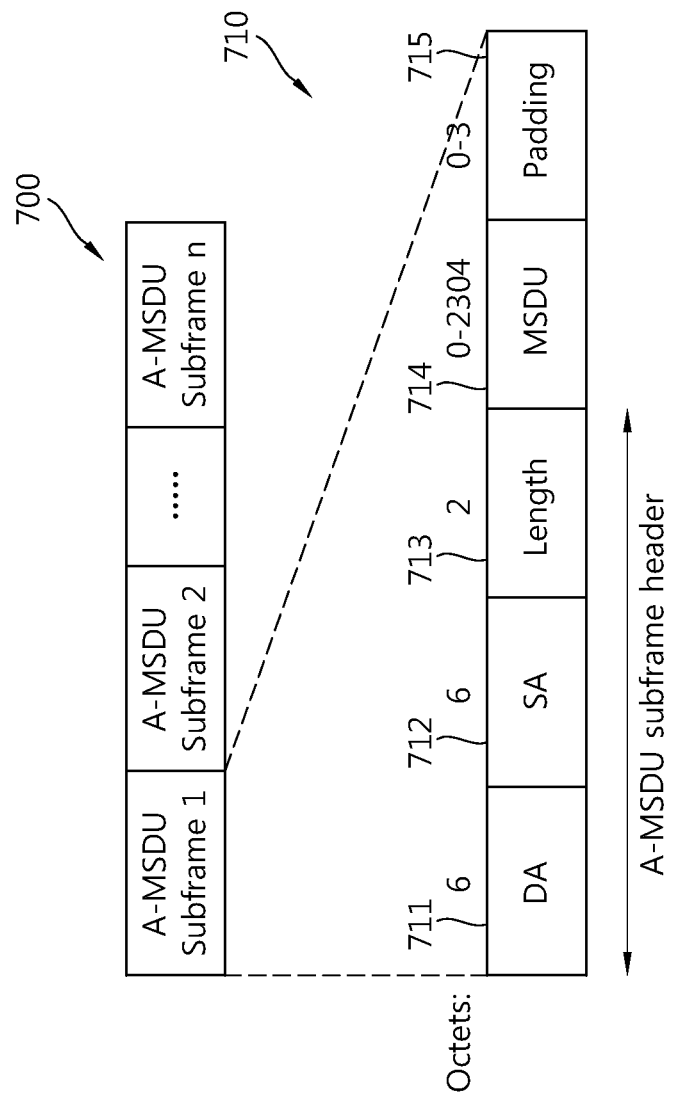
FIG. 7 is a diagram showing an A-MSDU format.

FIG. 7 is a diagram showing an A-MSDU format.

Referring to FIG. 7, an A-MSDU 700 includes at least one A-MSDU subframe. Each A-MSDU subframe 710 includes an A-MSDU subframe header, and includes an MSDU 714 related to an old frame. In addition, padding bits 715 are included to standardize a length of the A-MSDU subframe. For example, this may be for standardizing the length of the A-MSDU subframe to a multiple of 4 octets. However, the padding bits may not be included in a last A-MSDU subframe.

The A-MSDU subframe header may include a destination address (DA) field 711, a source address (SA) field 712, and a length field 713. When a multicast frame is transmitted in the A-MSDU format, an additional address field may be further acquired. Therefore, a multicast address may be included in the DA field 711 and/or the SA field 712. For example, it may be implemented such that the multicast address is included in the DA field 711.

If the AP and/or the STA constituting the WLAN system support the MU-MIMO transmission scheme as described above, a method of providing a DMS through the MU-MIMO transmission can be proposed. When the DMS is provided through the MU-MIMO transmission, a multicast frame can be transmitted by applying an MCS optimized for each STA, thereby improving a throughput of the WLAN system. In addition, since the AP can receive a reception acknowledgement from reception STAs in response to the multicast frame transmitted to each STA, reliability of frame transmission and reception can be improved by retransmitting the frame.

In order to provide the DMS through the MU-MIMO transmission as described above, it is necessary to satisfy conditions for MU-MIMO transmission. That is, a PPDU transmission time for STAs must be time-synchronized, and reception STAs must be able to know a multicast address.

To allow the aforementioned two conditions to be satisfied, it is possible to propose a method in which a multicast frame is converted into a frame of an A-MSDU format, is then aggregated to an A-MPDU, and is then transmitted through MU-MIMO transmission. In doing so, the reception STA can be allowed to know that a corresponding frame is a multicast frame since an A-MSDU subframe header of the A-MSDU includes the multicast address. In addition, since MU-MIMO transmission is performed by using the A-MPDU format, a transmission time of a PPDU transmitted to each STA can be synchronized. Such a characteristic has been described above with reference to FIG. 5 to FIG. 7.

However, when the PPDU is transmitted by simultaneously applying the A-MSDU and the A-MPDU as described above, aggregation is performed two times, which may lead to a problem of costs in terms of buffer capacity of a reception STA and there may be another problem in that an implementation complexity is increased. Therefore, the present invention proposes a method of transmitting and receiving a multicast frame, that is, of providing an DMS by transmitting a PPDU including an A-MPDU through MU-MIMO transmission instead of converting the multicast frame into a frame of the A-MSDU format.

To provide the DMS by using the A-MPDU, the reception STAs must be able to know the multicast address. However, unlike the A-MSDU, the A-MPDU does not include an additional address field that can be used for the multicast address. Therefore, when the PPDU is transmitted using the A-MPDU, the reception STAs cannot be allowed to report whether it is the multicast frame. To solve such a problem, the present invention proposes a method of delivering a multicast address to a reception STA by utilizing a group ID which is information included in a PLCP header of the PPDU.

When a plurality of reception STAs request the DMS, the AP can aggregate the STAs requesting the DMS as one group and then can assign a group ID. In this case, it is necessary for the group ID to have a relationship with a multicast address required for the STAs. That is, if a method is provided in which STAs can know a multicast address by confirming the group ID in a VHT-SIGA field of the PPDU, it is possible to provide the DMS by using the A-MPDU. This can be implemented through a DMS request/response process between the AP and the STAs. Hereinafter, the process will be described in greater detail with reference to the accompanying drawings.

Figure 8:
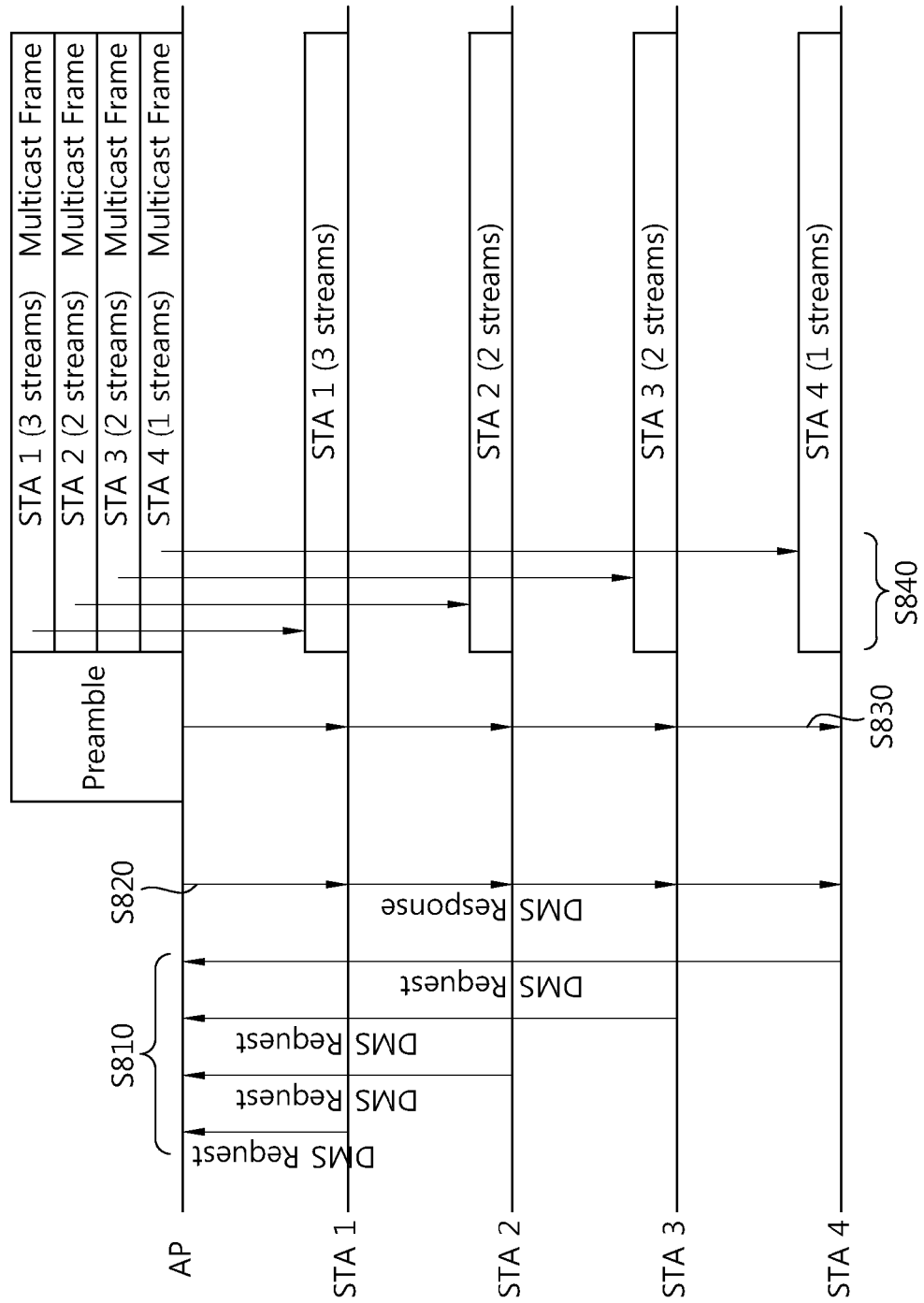
FIG. 8 shows a method of transmitting and receiving a multicast frame by using a MU-MIMO transmission scheme according to an embodiment of the present invention.

FIG. 8 shows a method of transmitting and receiving a multicast frame by using a MU-MIMO transmission scheme according to an embodiment of the present invention.

Referring to FIG. 8, to request transmission of the multicast frame in a unicast manner by using a DMS, an STA 1 to an STA 4 transmit a DMS request frame to an AP (step S810).

Figure 9:
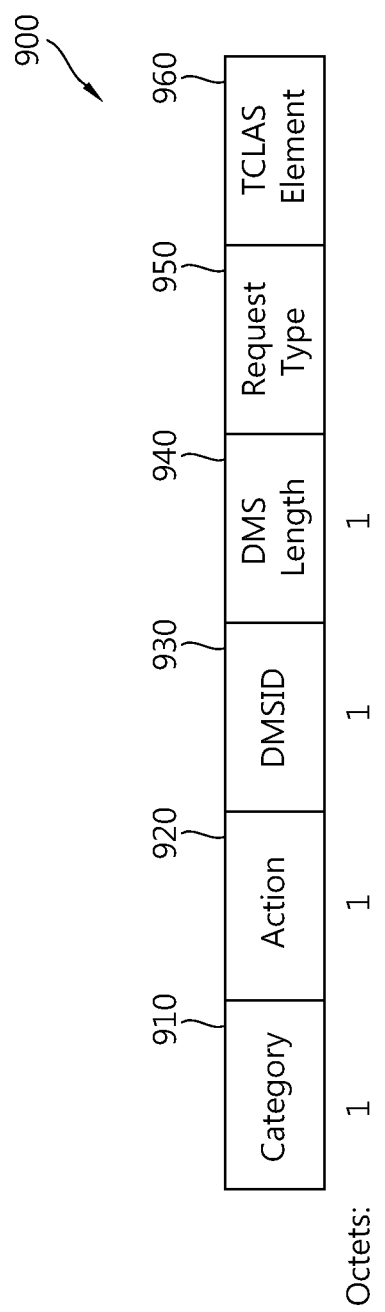
FIG. 9 is a diagram showing a format of a DMS request frame according to an embodiment of the present invention.

FIG. 9 is a diagram showing a format of a DMS request frame according to an embodiment of the present invention.

Referring to FIG. 9, a DMS request frame 900 includes a category field 910, an action field 920, a DMSID field 930, a DMS length field 940, a request type field 950, and a TCLAS element field 960. The category field 910 and the action field 920 can be configured to indicate that a corresponding frame is a DMS request frame. The DMS length field 940 can be configured to indicate a length of fields including the request type field 950 and the TCLAS element field 960.

The DMSID field 930 can be configured to an ID value for identifying a DMS requested by the STA. As shown in the embodiment of the present invention, if the STA for transmitting the DMS request frame 900 newly requests the DMS, the DMSID field 930 can be configured to 0. Meanwhile, if the STA transmits the DMS request frame 900 for the purpose of terminating the DMS currently being provided, the DMSID field 930 can be configured to an ID value capable of identifying the DMS which is intended to be terminated and which is currently being provided.

The request type field 950 can indicate a DMS request type of the DMS request frame. The DMS request type can be configured to 'add' indicating a request for providing a new DMS, 'remove' indicating a request for terminating the DMS currently being provided, and 'change' indicating a request for changing the DMS currently being provided.

The TCLAS element field 960 can include detailed information regarding multicast traffic to be transmitted by the STA in a unicast manner by providing the DMS. For example, it can be configured such that the TCLAS element field 950 includes a multicast address corresponding to the multicast traffic and/or the multicast frame intended to be transmitted.

Referring back to FIG. 8, upon receiving an MSE request frame from the STAs, the AP transmits a DMS response frame in response thereto (step S820). Although it is shown in FIG. 8 that the AP broadcasts the DMS response frame after receiving all of the DMS request frames transmitted from the STAs, this is for exemplary purposes only. Thus, the AP can transmit the DMS response frame in a unicast manner immediately after receiving a DMS request frame transmitted from a specific STA. The AP can also transmit the DMS response frame to each STA in the unicast manner after receiving the DMS request frames transmitted from the STAs.

Figure 10:
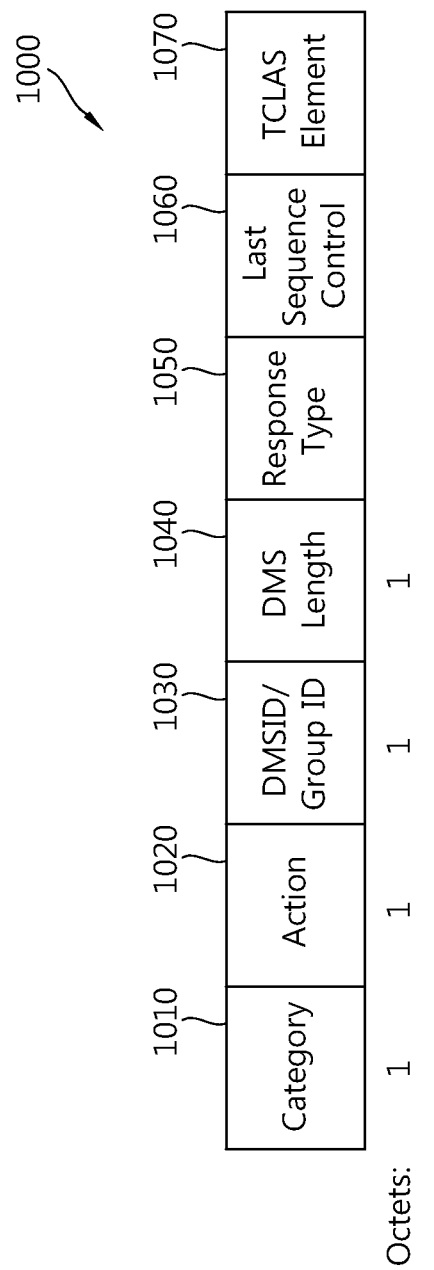
FIG. 10 is a diagram showing a format of a DMS response frame according to an embodiment of the present invention.

FIG. 10 is a diagram showing a format of a DMS response frame according to an embodiment of the present invention.

Referring to FIG. 10, a DMS response frame 1000 includes a category field 1010, an action field 1020, a DMSID/GROUP ID field 1030, a DMS length field 1040, a response type field 1050, a last sequence control field 1060, and a TCLAS element field 1070. The category field 1010 and the action field 1020 can be configured to indicate that a corresponding frame is the DMS response frame 1000. The DMS length field 1040 can be configured to indicate a length of fields including the response type field 1050, the last sequence control field 1060, and the TCLAS element field 1070.

The DMSID/GROUP ID field 1030 can be configured to indicate an ID of a DMS in response to a request of the STAs. If the DMS is newly requested by the STAs, the DMSID/GROUP ID field 1030 can be configured to an ID capable of identifying the DMS to be newly provided. If the STAs request to terminate the DMS currently being provided or to change the DMS currently being provided, the DMSID/GROUP ID field 1030 can be configured to the ID of the DMS.

If the DMS is provided through a MU-MIMO transmission scheme in response to the request of the STAs, the DMSID/GROUP ID field 1030 can be configured to indicate a group ID to be assigned for multicast frame transmission. In this case, the group ID may be a predetermined group ID related to a multicast address for the STAs or may be a group ID configured to have a relationship with the multicast address.

The response type field 1050 can be configured to indicate a result of a response of the AP in response to the DMS request. Table 1 below shows an example of the response type field 1050.

TABLE 1

| Field Value | Description | Notes |
| --- | --- | --- |
| 0 | Accept as SU DMS | AP accepts the DMS request as SU DMS. |
| 1 | Denied | AP reject the DMS request. |
| 2 | Terminate | AP terminates DMS previously accepted DMS request. |
| 3 | Accept as MU DMS | AP accepts the DMS request as MU DMS. |
| 4-255 | Reserved | |

If the response type field 1050 is configured to 0, it is a case where the AP is allowed to provide the DMS through the SU-MIMO transmission scheme.

If the response type field 1050 is configured to 3, it is a case where the AP is allowed to provide the DMS through the MU-MIMO transmission scheme. That is, it implies that the AP provides the DMS by using an A-MPDU. If the response type field 1050 is configured to 3, the DMSID/GROUP ID field 1030 can be configured to indicate a group ID assigned by the AP to provide the DMS service through MU-MIMO.

The TCLAS element field 1070 includes detailed information regarding multicast traffic to be transmitted by using the DMS. For example, it can be configured to indicate a multicast address corresponding to a group ID.

Referring back to FIG. 8, the AP transmits a preamble including a group ID for a DMS included in a DMS response frame (step S830), and transmits to each of the STAs an A-MPDU including a multicast frame by performing beamforming (step S840). The preamble includes training fields required to normally receive the PPDU and a PLDP header including control information. Signal fields constituting the PLCP header and the training fields included in the PPDU for MU-MIMO can be found in the aforementioned FIG. 3.

Each STA can confirm a value of a group ID assigned for a DMS through MU-MIMO transmission by receiving the VHT-SIGA field of the PLCP header. Thereafter, when receiving from the AP the PPDU transmitted through the MU-MIMO transmission scheme, the STA can confirm the group ID included in the VHT-SIGA field, and can determine whether the STA is a reception target STA of a multicast frame included in the PPDU. In addition, by comparing a group ID of reception target STA group including STAs requesting the DMS with the group ID included in the PPDU, the STAs can determine whether a frame currently being received or already been received is a multicast frame transmitted according to the DMS, a certain multicast address by which the multicast frame is transmitted, and/or a certain multicast frame which is transmitted by being converted into a unicast frame (not an A-MSDU format).

Each STA can normally acquire the A-MPDU including the multicast frame on the basis of information indicating the number of spatial streams included in the VHT-SIGA field of the PPDU, information indicating a length of a data field including the A-MPDU included in the VHT-SIGB field, and information indicating an MCS in use. In addition, each STA can acquire data included in a data frame transmitted in a multicast manner on the basis of a multicast address corresponding to the group ID.

Figure 11:
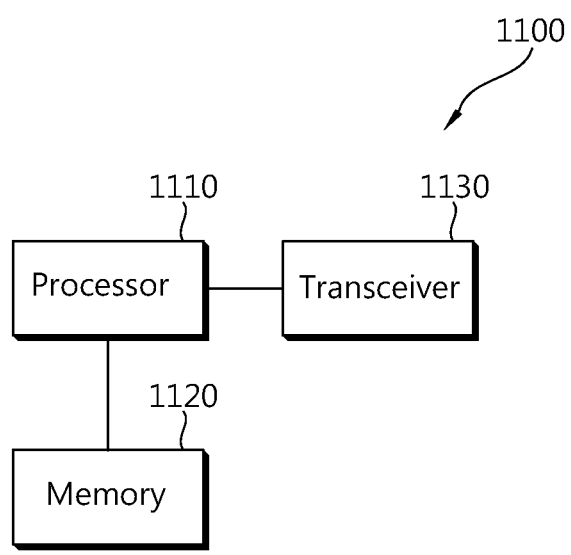
FIG. 11 is a block diagram showing a wireless apparatus for which an embodiment of the present invention is applicable.

FIG. 11 is a block diagram showing a wireless apparatus for which an embodiment of the present invention is applicable. The wireless apparatus may be an AP or an STA.

A wireless apparatus 1100 includes a processor 1110, a memory 1120, and a transceiver 1130. The transceiver 1130 transmits and/or receives a radio signal, and implements an IEEE 802.11 PHY layer. The processor 1110 is operationally coupled to the transceiver 1130, and implements IEEE 802.11 MAC and PHY layers. The processor 1110 is configured to be able to support a DMS according to the embodiment of the present invention. To support the DMS, the processor 1110 can be configured to generate/receive/transmit/interpret a DMS request frame/DMS response frame according to the embodiment of the present invention. The processor 1110 can be configured to transmit and receive a multicast frame through MU-MIMO by providing the DMS through the MU-MIMO transmission according to the embodiment of the present invention. The processor 1110 can be configured to implement the aforementioned various embodiments of the present invention described with reference to FIG. 4 to FIG. 10.

The processor 1110 and the transceiver 1130 may include an application-specific integrated circuit (ASIC), a separate chipset, a logic circuit, and/or a data processing unit. The memory 1120 may include a read-only memory (ROM), a random access memory (RAM), a flash memory, a memory card, a storage medium, and/or other equivalent storage devices. When the embodiment of the present invention is implemented in software, the aforementioned methods can be implemented with a module (i.e., process, function, etc.) for performing the aforementioned functions. The module may be stored in the memory 1120 and may be performed by the processor 1110. The memory 1120 may be located inside or outside the processor 1110, and may be coupled to the processor 1110 by using various well-known means.

The present invention provides a method of transmitting and a receiving a multicast frame by using a directed multicast service (DMS) through multi-user multiple input multiple output (MU-MIMO) transmission. A transmitter such as an access point (AP) can transmit a multicast frame through MU-MIMO transmission to a plurality of receivers such as stations (STAs). Accordingly, a throughput of a wireless local area network (WLAN) system can be improved.

The transmitter such as the AP can transmit the multicast frame by using a modulation and coding scheme (MCS) optimized for each receiver. In addition, the transmitter performing MU-MIMO transmission can receive a reception acknowledgement from the receiver. As a result, data transmission and reception reliability of the WLAN system can be improved.

Although the present invention has been particularly shown and described with reference to exemplary embodiments thereof, it will be understood by those skilled in the art that various changes in form and details may be made therein without departing from the spirit and scope of the invention as defined by the appended claims.

What is claimed is:

1. A method for transmitting multicast frames by a transmitter in a wireless local area network, the method comprising:
receiving, by the transmitter, a first directed multicast service (DMS) request frame from a first receiver, the first DMS request frame including a request type field for a request of a unicast transmission of a multicast frame;
receiving, by the transmitter, a second DMS request frame from a second receiver, the second DMS request frame including the request type field for the request of the unicast transmission of the multicast frame;
transmitting, by the transmitter, a DMS response frame to the first receiver and the second receiver, the DMS response frame including a response type field, a group identifier field, and a TCLAS element field, the response type field indicating whether the request of the unicast transmission of the multicast frame is accepted for the first receiver and the second receiver, the group identifier field including a group identifier indicating each of the first receiver and the second receiver receiving the multicast frame by the unicast transmission, and the TCLAS element field including a multicast address for the multicast frame corresponding to the group identifier; and
performing, by the transmitter, the unicast transmission for a physical layer convergence procedure (PLCP) protocol data unit (PPDU) carrying the multicast frame based on a multiple user (MU)-multiple input multiple output (MIMO) to each of the first receiver and the second receiver, the PPDU including a VHT-SIG A field including the group identifier,
wherein the first receiver determines whether the PPDU is the multicast frame transmitted by the unicast transmission based on the group identifier included in the VHT-SIG A field, and
wherein the first receiver determines the multicast address based on the group identifier included in the VHT-SIG A field and the multicast address corresponding to the group identifier included in the TCLAS element field when the first receiver determines that the PPDU is the multicast frame transmitted by the unicast transmission.

2. The method of claim 1,
wherein each of the first DMS request frame and the second DMS request frame further includes a TCLAS element field, and
wherein the TCLAS element field of each of the first DMS request frame and the second DMS request frame includes a multicast address used for the unicast transmission of the multicast frame.

3. The method of claim 1,
wherein the multicast frame includes a medium access control (MAC) header,
wherein the MAC header includes a transmitter address (TA) field and a receiver address (RA) field,
wherein the RA field of the multicast frame transmitted to the first receiver is set to a MAC address of the first receiver, and
wherein the RA field of the multicast frame transmitted to the second receiver is set to a MAC address of the second receiver.

4. The method of claim 1,
wherein the PPDU is a format of an aggregate MAC protocol data unit (A-MPDU), and
wherein the A-MPDU includes at least one A-MPDU subframe regarding the multicast frame.

5. An apparatus for transmitting multicast frames, the apparatus comprising:
- a transceiver configured to transmit or receive radio signals; and
- a processor operatively coupled to the transceiver and configured to:
  - receive a first directed multicast service (DMS) request frame from a first receiver, the first DMS request frame including a request type field for a request of a unicast transmission of a multicast frame;
  - receive a second DMS request frame from a second receiver, the second DMS request frame including the request type field for the request of the unicast transmission of the multicast frame;
  - transmit a DMS response frame to the first receiver and the second receiver, the DMS response frame including a response type field, a group identifier field, and a TCLAS element field, the response type field indicating whether the request of the unicast transmission of the multicast frame is accepted for the first receiver and the second receiver, the group identifier field including a group identifier indicating each of the first receiver and the second receiver receiving the multicast frame by the unicast transmission, and the TCLAS element field including a multicast address for the multicast frame corresponding to the group identifier; and
  - perform the unicast transmission for a physical layer convergence procedure (PLCP) protocol data unit (PPDU) carrying the multicast frame based on a multiple user (MU)-Multiple input multiple output (MIMO) to each of the first receiver and the second receiver, the PPDU including a VHT-SIG A field including the group identifier,
  - wherein the first receiver determines whether the PPDU is the multicast frame transmitted by the unicast transmission based on the group identifier included in the VHT-SIG A field, and
  - wherein the first receiver determines the multicast address based on the group identifier included in the VHT-SIG A field and the multicast address corresponding to the group identifier included in the TCLAS element field when the first receiver determines that the PPDU is the multicast frame transmitted by the unicast transmission.

6. The apparatus of claim 5,
- wherein each of the first DMS request frame and the second DMS request frame further includes a TCLAS element field, and
- wherein the TCLAS element field of each of the first DMS request frame and the second DMS request frame includes a multicast address used for the unicast transmission of the multicast frame.

7. The apparatus of claim 5,
- wherein the multicast frame includes a medium access control (MAC) header,
- wherein the MAC header includes a transmitter address (TA) field and a receiver address (RA) field,
- wherein the RA field of the multicast frame transmitted to the first receiver is set to a MAC address of the first receiver, and
- wherein the RA field of the multicast frame transmitted to the second receiver is set to a MAC address of the second receiver.

8. The apparatus of claim 5,
- wherein the PPDU is a format of an aggregate MAC protocol data unit (A-MPDU), and
- wherein the A-MPDU includes at least one A-MPDU subframe regarding the multicast frame.

* * * * *